(12) United States Patent
Badarinarayan et al.

(10) Patent No.: US 8,038,178 B2
(45) Date of Patent: Oct. 18, 2011

(54) HIGH PRESSURE FUEL PIPE CONSTRUCTION FOR AN INTERNAL COMBUSTION ENGINE

(75) Inventors: Harsha Badarinarayan, Canton, MI (US); Akira Inoue, Farmington Hills, MI (US); Takashi Yoshizawa, Novi, MI (US); Atsushi Hohkita, Novi, MI (US); Hiroaki Saeki, West Bloomfield, MI (US); Hiroshi Ono, Novi, MI (US); Masahiro Soma, Danville, KY (US); William Harvey, Brighton, MI (US); Steve Miller, Livonia, MI (US); Su-Wei Sung, Ann Arbor, MI (US)

(73) Assignee: Hitachi, Ltd, Tokyo (JP)

( * ) Notice: Subject to any disclaimer, the term of this patent is extended or adjusted under 35 U.S.C. 154(b) by 155 days.

(21) Appl. No.: 12/414,795

(22) Filed: Mar. 31, 2009

(65) Prior Publication Data

US 2010/0244440 A1 Sep. 30, 2010

(51) Int. Cl.
*F16L 13/02* (2006.01)
(52) U.S. Cl. ........ 285/288.1; 285/62
(58) Field of Classification Search .......... 285/261, 285/266, 121.7, 146.1–146.3, 114, 61, 62, 285/288.1
See application file for complete search history.

(56) References Cited

U.S. PATENT DOCUMENTS

| | | | | |
|---|---|---|---|---|
| 45,218 A * | 11/1864 | Beckers | ......................... | 138/110 |
| 664,291 A * | 12/1900 | Reniff | ........................... | 285/107 |
| 1,156,145 A * | 10/1915 | Jenkins | .......................... | 285/64 |
| 1,425,635 A * | 8/1922 | Dod | ............................. | 285/121.7 |
| 2,421,691 A * | 6/1947 | Gibson, Jr. et al. | ........... | 285/101 |
| 2,520,896 A * | 8/1950 | Smulski | ....................... | 285/190 |
| 2,549,027 A * | 4/1951 | Smulski | ..................... | 15/250.04 |
| 2,853,262 A * | 9/1958 | Reimann | ....................... | 248/75 |
| 3,404,904 A * | 10/1968 | Roe | ............................. | 285/145.3 |
| 4,158,462 A * | 6/1979 | Coral | .......................... | 285/144.1 |
| 4,524,994 A * | 6/1985 | Anderson | ...................... | 285/38 |
| 4,540,202 A * | 9/1985 | Amphoux et al. | ............ | 285/184 |
| 4,669,761 A * | 6/1987 | Huling | ......................... | 285/330 |
| 5,460,247 A * | 10/1995 | Fouts | .......................... | 188/71.1 |
| 5,542,713 A * | 8/1996 | Miyazaki et al. | ........... | 285/136.1 |
| 6,601,877 B2 * | 8/2003 | Nishikawa et al. | ............ | 285/62 |
| 7,198,066 B2 * | 4/2007 | Kagenow | ..................... | 138/110 |
| 7,216,676 B2 * | 5/2007 | Barnhouse et al. | ........... | 138/177 |
| 7,516,735 B1 * | 4/2009 | Doherty et al. | ............... | 123/468 |
| 7,571,744 B2 * | 8/2009 | Zia et al. | ....................... | 138/106 |
| 2006/0284421 A1 | 12/2006 | Fonville et al. | | |

* cited by examiner

*Primary Examiner* — Aaron Dunwoody
(74) *Attorney, Agent, or Firm* — Gifford, Krass, Sprinkle, Anderson & Citkowski, P.C.

(57) ABSTRACT

A high pressure fuel pipe construction for an internal combustion engine, such as a direct injection engine. A conduit for the fuel is open at each end and a ball having a throughbore is slidably positioned over one end of the conduit. A reinforcing sleeve is positioned inside the end of the conduit so that the sleeve extends entirely through the ball. The sleeve, ball and the end of the conduit are then brazed together to attach the ball and conduit together. A double chamfer is provided at one end of the ball throughbore to facilitate inspection of the brazing quality. Additionally, a loop is formed in the conduit and a dampener is attached to the loop.

5 Claims, 3 Drawing Sheets

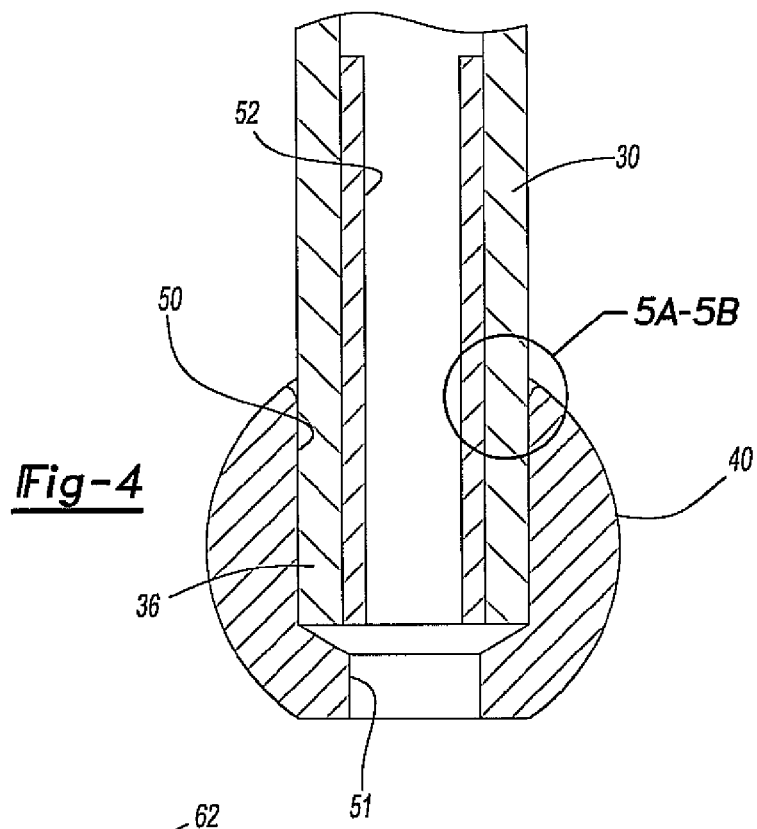
*Fig-4*
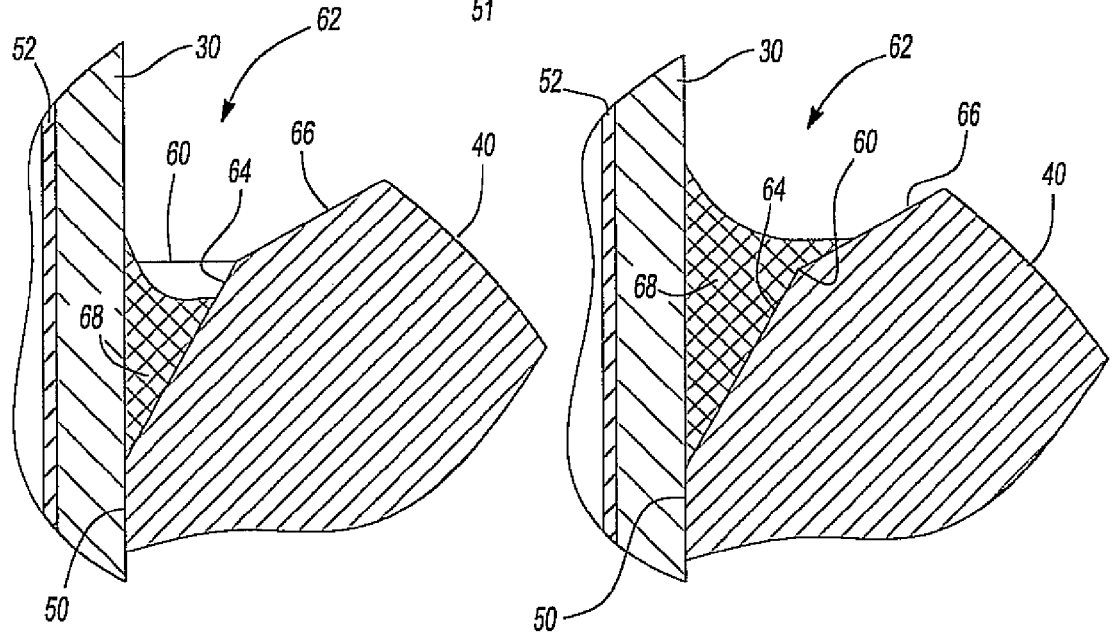
*Fig-5A*        *Fig-5B*

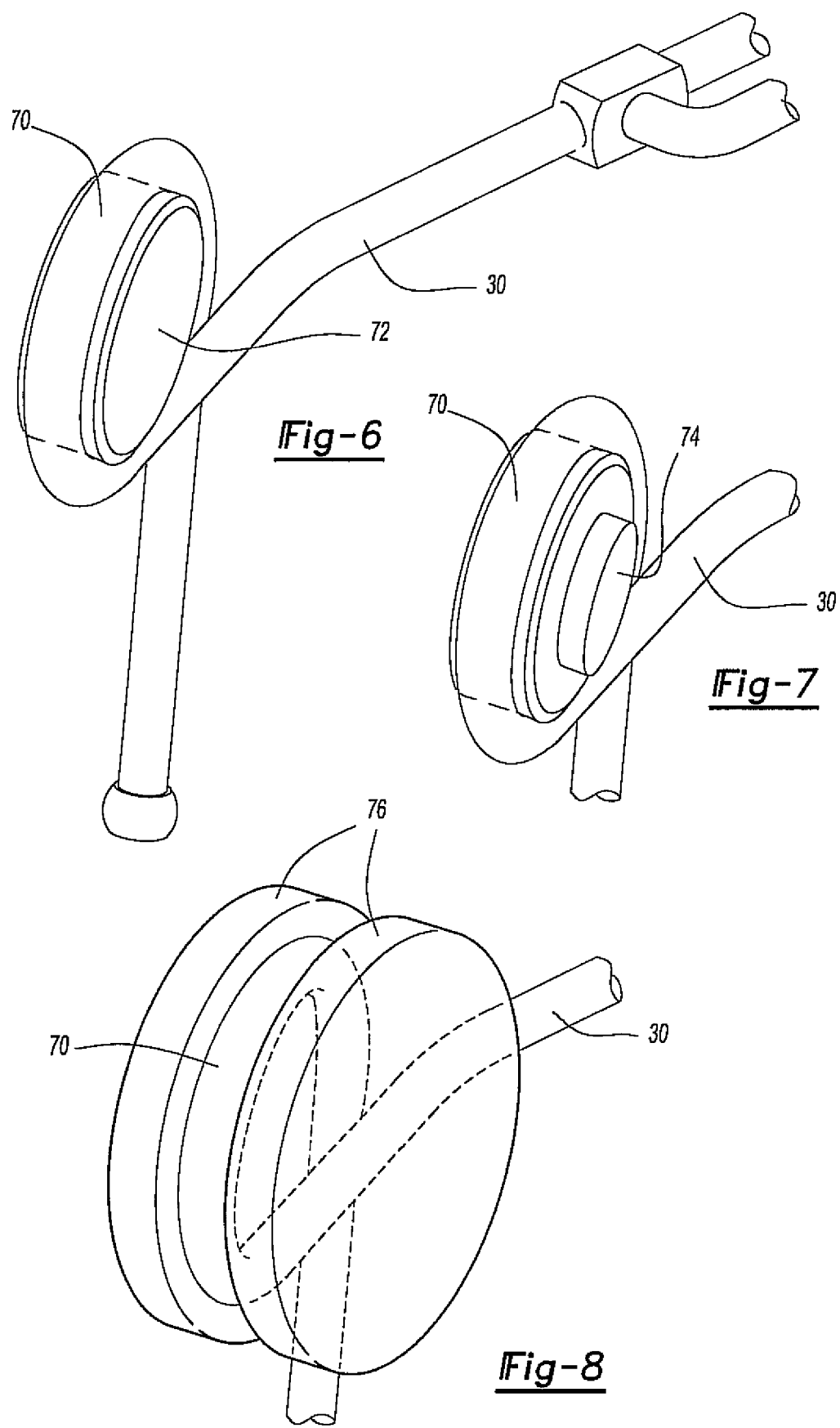

HIGH PRESSURE FUEL PIPE CONSTRUCTION FOR AN INTERNAL COMBUSTION ENGINE

BACKGROUND OF THE INVENTION

I. Field of the Invention

The present invention relates generally to fuel systems for internal combustion engines and, more particularly, to a high pressure fuel pipe construction particularly suited for a direct injection engine.

II. Description of Related Art

Many modern internal combustion engines of the type used in the automotive industry rely upon high pressure fuel injection to supply fuel to the engine. Typically, a rigid metal conduit has one end attached to the outlet from a high pressure fuel pump while the opposite end of the conduit is open to a fuel rail. Conventionally, a ball is attached to each end of the fuel conduit and this ball is received within a like shaped seat on both the fuel pump outlet as well as the fuel rail for the fuel injectors. Nuts then secure the balls to their seat at both the fuel rail as well as the fuel pump.

The previously known fuel conduits have proven adequate for many types of internal combustion engines, such as multipoint injection engines. However, modern day internal combustion engines increasingly utilize direct injection into the engine combustion chamber for increased efficiency and fuel economy. Since the fuel injector for direct injection engines must overcome the high pressures present within the internal combustion engine, the previously known fuel systems for direct injection engines require higher fuel pressure than the previously known multipoint fuel injection systems.

The fuel supply systems for direct injection engines are subjected to increased mechanical stress as contrasted with the previously known multipoint fuel injection systems. This increased mechanical stress results not only from engine vibration imparted directly to the fuel delivery system, but also high pressure pulsations from the fuel pump itself. In extreme cases, this high mechanical stress imposed upon the fuel system can cause a failure of the fuel delivery system. Such failures may result in cracks formed between the connection of the ball couplings at the ends of the fuel supply conduit.

Although thicker tubing may be used as the fuel supply conduit, such thicker tubing increases not only the cost of the fuel system, but also its weight.

SUMMARY OF THE PRESENT INVENTION

The present invention provides a high pressure fuel pipe construction for internal combustion engines which overcomes the above-mentioned disadvantages of the previously known systems.

In brief, the high pressure fuel pump construction of the present invention comprises a conduit constructed of a rigid material, such as metal. The conduit is open at each end and one end of the conduit is fluidly attached to the fuel pump while the opposite end of the conduit is attached to one or more fuel rails for the fuel injectors.

In order to create the fluid coupling between both the fuel supply conduit and the fuel rail, as well as between the fuel conduit and the fuel pump, a fluid coupling ball is brazed or otherwise secured to the end of the conduit. This ball is dimensioned to nest within a seat in the fuel rail inlet as well as a similar seat in the fuel pump outlet. As before, a coupling nut at each end of the fluid conduit threadably secures the balls within and against their respective seats to form the fluid coupling.

Unlike the previously known fuel systems, however, a sleeve constructed of a rigid material, such as metal, is press fit into at least one end of the fuel conduit so that the sleeve extends not only into the end of the fuel conduit, but also through the ball. The ball, sleeve and end of the fluid conduit are then fixedly secured together, preferably by brazing, to form a fluid-tight connection between the ball and the conduit.

In practice, the additional sleeve extending through the ball and into the end of the conduit serves to rigidify the conduit at its connection with the ball by effectively increasing the thickness of the fluid conduit in the area around the ball. In practice, the addition of the sleeve sufficiently rigidities the connection between the ball and the fluid conduit against failure due to mechanical stress without unnecessarily increasing the weight and cost of the entire fuel supply conduit.

In order to ensure an adequate braze connection between the ball, sleeve and conduit preferably the ball includes a conic shaped opening at least one end that is concentric with the ball throughbore. An indicator line is formed on the conic opening at a position such that, if brazed material fills the conic opening above the indicator line, the braze is satisfactory. Preferably, the indicator line is formed by providing a double chamfer on the ball concentrically with its throughbore.

In order to her dampen vibrations of the fluid conduit, the fluid conduit also preferably includes a loop between its ends. A dampener made of a resilient material, such as an elastomeric material, is then attached to the loop. The dampener may be either contained within the loop or, alternatively, encompass the loop. Optionally, a high density mass is attached to the dampener to further offset vibrations in the fluid conduit which would otherwise be caused by the fuel pump and/or engine.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 4 is a longitudinal sectional view illustrating an end of the fuel pipe construction;

FIGS. 5A and 5B taken around circle 5A-5B in FIG. 4 and are both fragmentary sectional views illustrating respectively an unacceptable braze and an acceptable braze;

FIG. 6 is an elevational view of the fuel pipe construction with an attached dampener;

FIG. 7 is an elevational view illustrating a modification of the dampener of FIG. 6; and FIG. 8 is a view similar to both FIGS. 6 and 7, but illustrating still a further modification thereof.

DETAILED DESCRIPTION OF PREFERRED EMBODIMENTS OF THE PRESENT INVENTION

Figure 1:
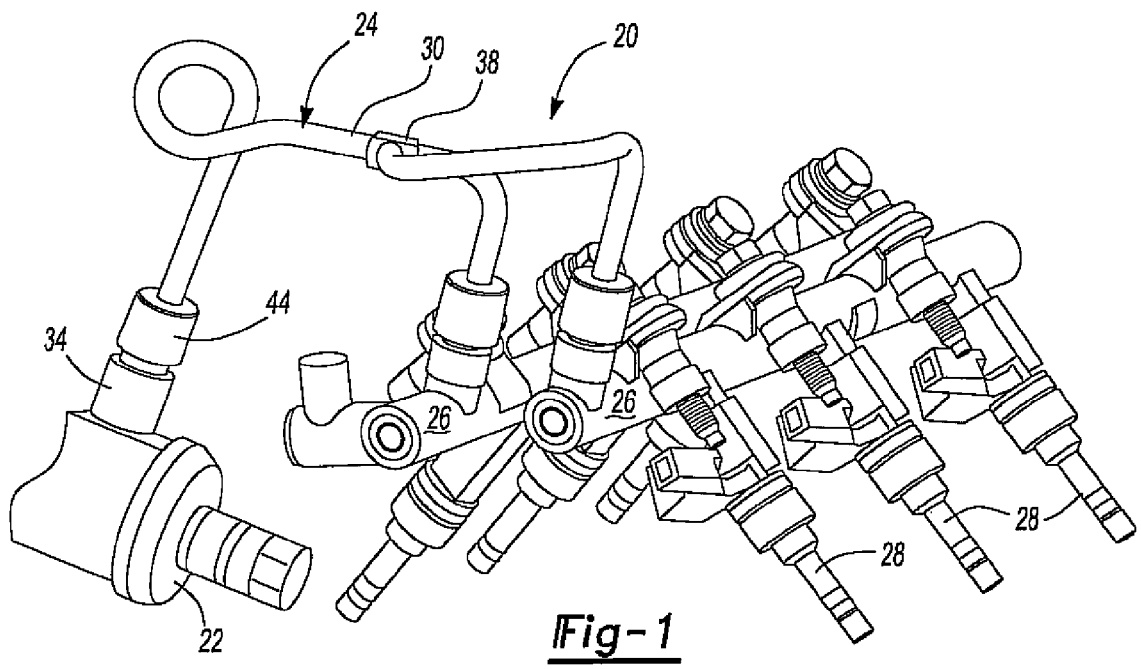
FIG. 1 is an elevational view of a fuel system for a direct injection engine.

With reference first to FIG. 1, a portion of a fuel injection system 20 for a high pressure internal combustion engine, such as a direct injection engine, of the type used in the automotive industry is shown. The fuel delivery system 20 includes a high pressure fuel pump 22 which pumps fuel from a fuel tank (not shown), through a high pressure fuel pipe construction 24 and to one or more fuel rails 26. A plurality of fuel injectors 28 are then fluidly connected to the fuel rails 26 to supply fuel to the engine.

Figure 2:
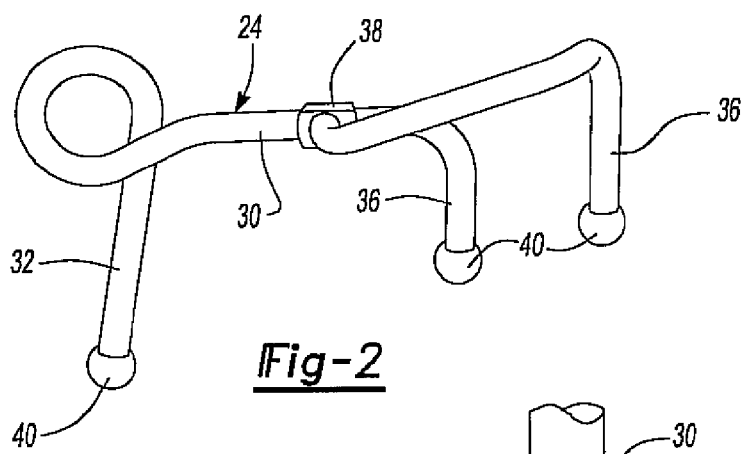
FIG. 2 is an elevational view of the high pressure fuel pipe construction for the direct injection engine.

With reference now to FIGS. 1 and 2, the high pressure fuel pipe construction 24 includes an elongated fuel supply conduit 30 made of a rigid material, such as metal. The conduit 30 is open at both ends and one end 32 of the conduit 30 is fluidly connected to an outlet 34 from the fuel pump 22 while the other ends 36 of the fuel conduit 30 are fluidly connected to the fuel rails 26. A T junction 38 in the conduit is provided to accommodate the second fuel rail 26.

Figure 3:
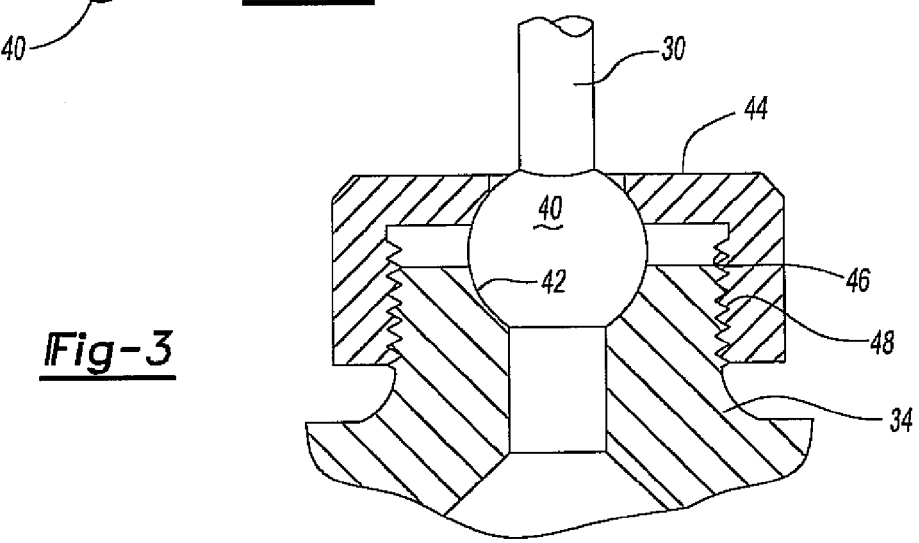
FIG. 3 is a sectional view illustrating one compression fitting for the present invention.

With reference now to FIGS. 1-3, a ball 40 is attached to each open end of the fuel conduit 30. Each ball 40 includes a throughbore 50 (FIG. 4) which registers with the interior of the fuel conduit 30 to permit fuel flow through the ball 40.

With reference now particularly to FIG. 3, a compression fitting is used to fluidly connect the balls 40 to the fuel pump outlet 34 or fuel rails 26. Since the compression fittings between the fuel pump outlet 34 and the fuel rails 26 are substantially the same, only the connection with the fuel pump outlet 34 will be described in detail, it being understood that a like description should also apply to the fluid connection between the fuel conduit 30 and the fuel rails 26.

With reference still to FIG. 3, the fuel pump outlet 34 includes a seat 42 which is complementary in shape to the outer periphery of the ball 40. A nut 44 is slidably disposed over the fuel conduit 30 which includes internal threads 46. These internal threads 46 threadably engage external threads 48 formed around the seat 42. Upon tightening of the nut 44, the nut 44 engages the ball 40 and compresses it against the seat 42 thus fluidly sealing the ball 40 to the seat 42.

With reference now to FIG. 4, the connection between the fuel conduit 30 and the ball 40 is shown in greater detail. In order to strengthen the fuel conduit 30 against mechanical stresses caused not only by vibration of the engine, but also by vibrations from the fuel pump 22, a copper clad or copper preform sleeve 52 is press fit into the interior of the fuel conduit 30. The sleeve 52, furthermore, is dimensioned so that the sleeve 52 has a length greater than the diameter of the ball 40.

At least a portion of the ball throughbore 50 is the same size as the outside diameter of the fuel conduit 30 and ends in a reduced diameter portion 51 at one end of the throughbore 50. In order to attach the ball 40 to the fuel conduit 30, after insertion of the sleeve 52 into the conduit 30, the ball 40 is pressed onto the end 36 of the fluid conduit 30. In doing so, the interior of the fuel conduit 30 is fluidly coupled to the ball throughbore 50.

With reference now to FIGS. 5A and 5B, in order to secure the reinforcing sleeve, fuel conduit 30 and ball 40 together, the ball 40, sleeve 52 and fluid conduit 30 are preferably brazed together. In order to facilitate inspection of the braze to ensure that it meets acceptable qualities, an indicator line 60 is provided around a conical recess 62 at one end of the ball throughbore 50. Preferably, this indicator line 60 is formed by the intersection of two chamfers 64 and 66 which intersect each other at the indicator line 60. The chambers 64 and 66 are formed at different angles.

If the brazing material 68 following the brazing operation fails to rise above the indicator line 60 as shown in FIG. 5A, the braze is unsatisfactory. Conversely, if the braze material 68 rises above the indicator line 60 following the brazing operation as shown in FIG. 5B, the braze is satisfactory.

With reference now to FIG. 6, in order to dampen vibration of the fuel conduit 30 during operation of the engine, the conduit 30 preferably includes a loop 70 formed between its ends. A dampener 72 formed of a resilient material, such as an elastomeric material, is then positioned within and attached to the interior of the loop 70. In operation, vibrations within the conduit 30 are effectively dampened by the dampener 72.

With reference now to FIG. 7, a modification of the dampener 72 is shown. In FIG. 7, a mass 74 of a high density material, such as metal, is attached to the dampener 72. This high density material 74 offsets the vibration in the fluid conduit 30 caused by the operation of the invention thereby dampening vibration and reducing noise caused by such vibration.

With reference now to FIG. 8, a still further embodiment of the dampener is shown in which the loop 70 is sandwiched in between two discs 76 of dampening material. The dampener illustrated in FIG. 8 may be formed from any suitable material, such as a resilient material or an elastomeric material.

From the foregoing, it can be seen that the present invention provides a high pressure fuel pipe construction for use in internal combustion engines, such as direct injection engines, which not only strengthens the fuel pipe against mechanical strain, but also reduces vibration, and the resultant noise, of the fuel pipe. Having described our invention, however, many modifications thereto will become apparent to those skilled in the art to which it pertains without deviation from the spirit of the invention as defined by the scope of the appended claims.

We claim:

1. A high pressure fuel pipe construction for an internal combustion engine comprising:
    a conduit open at each end,
    a ball having a throughbore, at least a portion of said throughbore dimensioned to slidably receive one end of said conduit through one end of said throughbore,
    said ball including two adjacent chamfers coaxial with said one end of said throughbore, said chamfers being formed at different angles and forming an indicator line at the intersection of said chamfers,
    wherein said ball and said conduit are brazed together, and
    wherein said indicator line is representative of an acceptable braze joint when said indicator line is hidden by braze material after said ball and conduit are brazed together.

2. A high pressure fuel pipe construction for an internal combustion engine comprising:
    a conduit open at each end, said conduit having a loop formed between its ends, said loop having at least one full turn,
    a ball having a throughbore, at least a portion of said throughbore dimensioned to slidably receive one end of said conduit,
    a vibration dampener attached to and within said loop, said dampener made of a resilient elastomeric material.

3. The invention as defined in claim 2 wherein said dampener comprises a pair of discs, said loop being sandwiched between said discs.

4. The invention as defined in claim 2 wherein said dampener is positioned in the interior of said loop.

5. The invention as defined in claim 2 and comprising a high density mass attached to said dampener.

* * * * *